M. A. JENNINGS.
LOCKING DEVICE FOR AUTOMOBILES.
APPLICATION FILED JULY 26, 1918.
1,303,800.
Patented May 13, 1919.
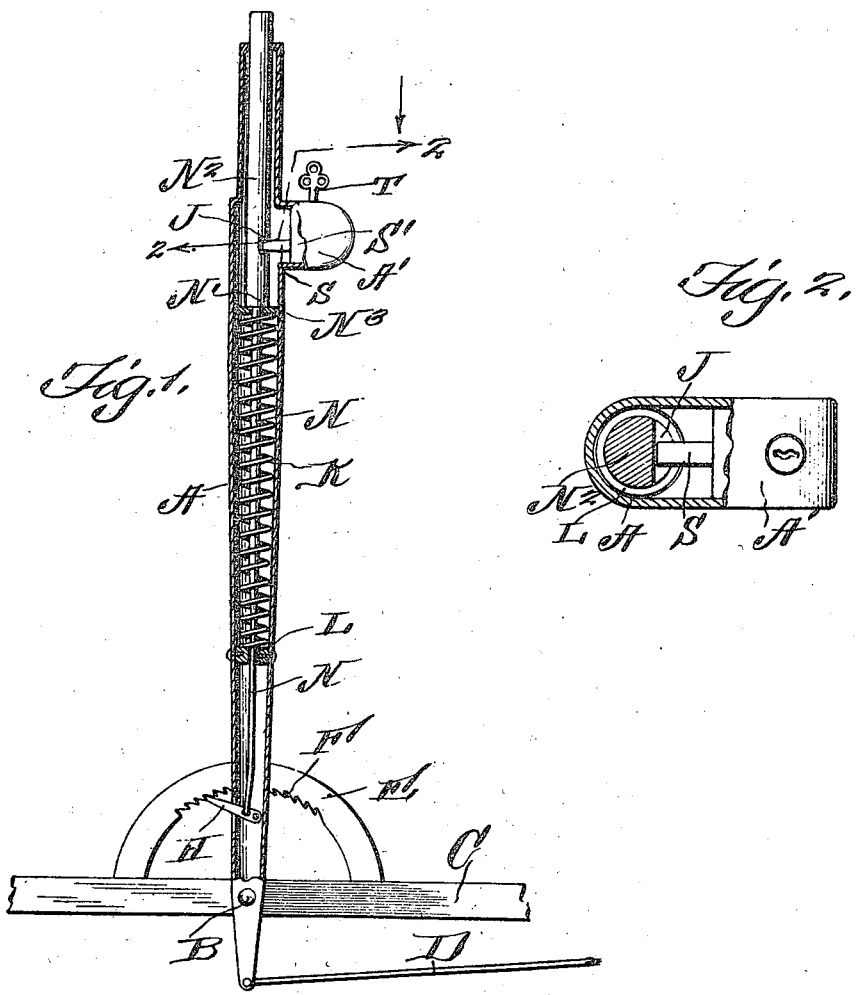
Witnesses
R. A. Boswell
A. L. Hough
Inventor
Martin A. Jennings,
By Franklin A. Hough
Attorneys

UNITED STATES PATENT OFFICE.

MARTIN A. JENNINGS, OF GLENVIL, NEBRASKA.

LOCKING DEVICE FOR AUTOMOBILES.

1,303,800.  Specification of Letters Patent.  Patented May 13, 1919.

Application filed July 26, 1918. Serial No. 246,887.

*To all whom it may concern:*

Be it known that I, MARTIN A. JENNINGS, a citizen of the United States, residing at Glenvil, in the county of Clay and State of Nebraska, have invented certain new and useful Improvements in Locking Devices for Automobiles; and he does hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in means for locking the lever controlling the emergency brake and transmission gears of an automobile, and comprises a simple and efficient device of this nature having various details of construction, combination and arrangement of parts which will be hereinafter fully described, shown in the accompanying drawings and then specifically defined in the appended claim.

My invention is illustrated in the accompanying drawings which, with the letters of reference marked thereon, form a part of this application, and in which:

Figure 1 is a side elevation partially in section, and

Fig. 2 is a cross sectional view taken on line 2—2 of Fig. 1.

Reference now being had to the details of the drawings by letter:

A designates an emergency brake lever which is pivotally mounted upon a pin B secured to the frame C of the car, and to the lower end of which the rod D is pivoted. A segment member E having a series of teeth F upon its lower curved edge is fastened to said frame, and H is a pawl pivoted to the lever and adapted to engage said teeth to hold the lever in an adjusted position. A rod N is mounted within the hollow portion of the lever and is pivoted at its lower end to the pawl H and said rod has a shouldered portion N', and intermediate the shoulder and the outer end of the rod is an enlarged cylindrical part N² having a longitudinal movement within the outer end of the lever, and the free end of said enlarged portion N² projects beyond the end of the lever. A coiled spring K is mounted about said rod within the lever and bears at its lower end against a pin L, and its upper end engages the shoulder N'. Said lever has a lateral projection A' in which a lock (not shown), of any suitable construction, is provided with a tongue S which, through the medium of a key T, may be thrown into a notch J, formed in the enlarged portion N² of the rod N, for the purpose of holding the rod N and the pawl H in locked positions. The enlarged portion N² of the rod N projects a short distance above the upper end of the lever a sufficient distance to permit an inward thrust to be imparted to the rod N by pressure applied to the projecting end, for the purpose of throwing the pawl H out of engagement with the teeth F after the tongue S has been thrown out of the notch J, and which will permit the lever to be moved forward or backward without interference, and accordingly release or lock the emergency brake and transmission gears, etc.

By the provision of a locking means embodying the features of my invention, it will be noted that the emergency brake and the transmission gears in neutral may be held in locked relation, making it impossible to start the motor without first releasing the locking means, thus insuring the car against theft, etc.

What I claim to be new is:

A device for locking emergency brakes of transmission gears in neutral, consisting of a hollow tapering lever having a slot in the wall thereof, an apertured disk fastened within the lever, a rod movable through said disk, a pawl pivoted within the lever at one side of the longitudinal center of the latter and extending through said slot and to which pawl said rod is pivoted, a curved ratchet segment engaged by said pawl, the upper portion of the rod being of enlarged cylindrical shape and guided in an aperture in the top of the lever, the circumference of the cylindrical portion being notched, a disk movable within the lever, and a spring interposed between the disks adapted to hold the movable one against a shoulder upon the rod said lever having a laterally extending chambered portion, a lock therein having a bolt designed to engage a notch in the rod above the shouldered portion thereof.

In testimony whereof I hereunto affix my signature in presence of two witnesses.

MARTIN A. JENNINGS.

Witnesses:
J. J. MOHLMAN,
V. M. NEWELL.